(12) United States Patent
Iwase (10) Patent No.: US 7,059,596 B2
(45) Date of Patent: Jun. 13, 2006

(54) SHEET FEEDER

(75) Inventor: Morikazu Iwase, Toyohashi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1208 days.

(21) Appl. No.: 09/925,534

(22) Filed: Aug. 10, 2001

(65) Prior Publication Data

US 2002/0054381 A1 May 9, 2002

(30) Foreign Application Priority Data

Aug. 10, 2000 (JP) .............................. 2000-242385

(51) Int. Cl.
*B65H 3/06* (2006.01)

(52) U.S. Cl. ..................... 271/114; 271/117; 271/118

(58) Field of Classification Search ................ 271/114, 271/116, 117, 118
See application file for complete search history.

(56) References Cited

U.S. PATENT DOCUMENTS 5,624,109 A * 4/1997 Tanaka .................... 271/10.13
6,382,619 B1 * 5/2002 Gustafson et al. .......... 271/117
6,390,463 B1 * 5/2002 Iwago ....................... 271/118

FOREIGN PATENT DOCUMENTS

| EP | 0 680 903 B1 | 11/1995 |
| JP | A 1-247337 | 10/1989 |
| JP | A 11-236139 | 8/1999 |

* cited by examiner

*Primary Examiner*—David H. Bollinger
(74) *Attorney, Agent, or Firm*—Oliff & Berridge, PLC (57) ABSTRACT

In a sheet feeder, when rotating force transmitted to a transmission gear is smaller than frictional force generated on a contact surface between a friction sheet and a transmission plate, the transmission plate is rotated together with the transmission gear, so that a drive shaft may rotate together with the transmission plate and the transmission gear. When the rotating force transmitted to the transmission gear is greater than the frictional force generated on the contact surface between the friction sheet and the transmission plate, each of surfaces of the friction sheet contacting the transmission plate and the transmission plate contacting the friction sheet slidably move, so that the transmission gear may rotate freely relative to the drive shaft. Thus, the sheet feeder restricts excessive rotating force being transmitted to a pick-up roller, so that damage or malfunction of the pick-up roller or a drive unit is prevented.

32 Claims, 10 Drawing Sheets

SHEET FEEDER

BACKGROUND OF THE INVENTION

1. Field of Invention

The invention relates to a sheet feeder, for use in an image forming apparatus, such as a copying machine, a printer, and a facsimile machine, that feeds a sheet of paper with a pick-up roller. More particularly, it relates to such a sheet feeder that restricts excessive rotating force to be transmitted to the pick-up roller from a drive unit, to prevent the pick-up roller and the drive unit from being damaged or malfunctioning.

2. Description of Related Art

A sheet feeder for use in, for example, a facsimile machine is structured so as to feed a stack of recording sheets, one by one, in a predetermined feeding direction by contacting a pick-up roller to upper surfaces of the recording sheets and rotating the roller in a recording sheet feeding direction. Such a sheet feeder typically includes the pick-up roller that provides some frictional force with a surface thereof and that feeds the recording sheets, a motor that generates rotating force, and a plurality of gears that transmit the rotating force of the motor to the pick-up roller. In the sheet feeder, the rotating force of the motor is transmitted to the pick-up roller by the plurality of gears. By the transmission of the rotating force, the pick-up roller contacting the recording sheet is rotated in the recording sheet feeding direction. The pick-up roller separates the topmost recording sheet from a stack of other recording sheets and feeds the topmost recording sheet.

The above-described sheet feeder has some problems in the recording sheet feeding. The motor and the pick-up roller are always connected through the plurality of gears. Therefore, the rotation of the pick-up roller may be restricted due to, for example, paper jams, or even when rotating resistances of the pick-up roller increase, the rotating force of the motor may continuously be transmitted to the pick-up roller and the gears. Therefore, the excessive rotating load is applied to the pick-up roller and the gears, resulting in damage to the pick-up roller and the gears. As the motor is restricted in its rotation, the motor does not operate in accordance with drive pulse signals, and may generate acoustic noise attributable to the repeated rotation in a forward and reverse directions or a further malfunction.

SUMMARY OF THE INVENTION

To solve the above-described problems, one aspect of the invention is to provide a sheet feeder that restricts excessive rotating force to be transmitted to a pick-up roller from a drive unit, in order to prevent the pick-up roller and the drive unit from being damaged or malfunctioning.

To achieve this aspect, a sheet feeder according to the invention may include a sheet holding member that holds a sheet, a pick-up roller that feeds the sheet held by the sheet holding member, a holder member that rotatably supports the pick-up roller, a drive shaft that supports the holder member and is directly or indirectly connected to the pick-up roller, a frame member that rotatably supports each end of the drive shaft in a direction of an axis thereof, a drive unit that applies rotating force to the drive shaft supported by the frame member, a transmission member that surrounds an end of the drive shaft in the direction of the axis thereof and transmits the rotating force applied by the drive unit thereto, and a pressing member that presses the transmission member to the drive shaft with predetermined frictional force.

BRIEF DESCRIPTION OF THE DRAWINGS

An exemplary embodiment of the invention will be described in detail with reference to the following figures wherein.

Further objects, details, and advantages of the invention will be apparent from the following detailed description, when read in conjunction with the drawings.

DETAILED DESCRIPTION OF PREFERRED EMBODIMENTS

Figure 1:
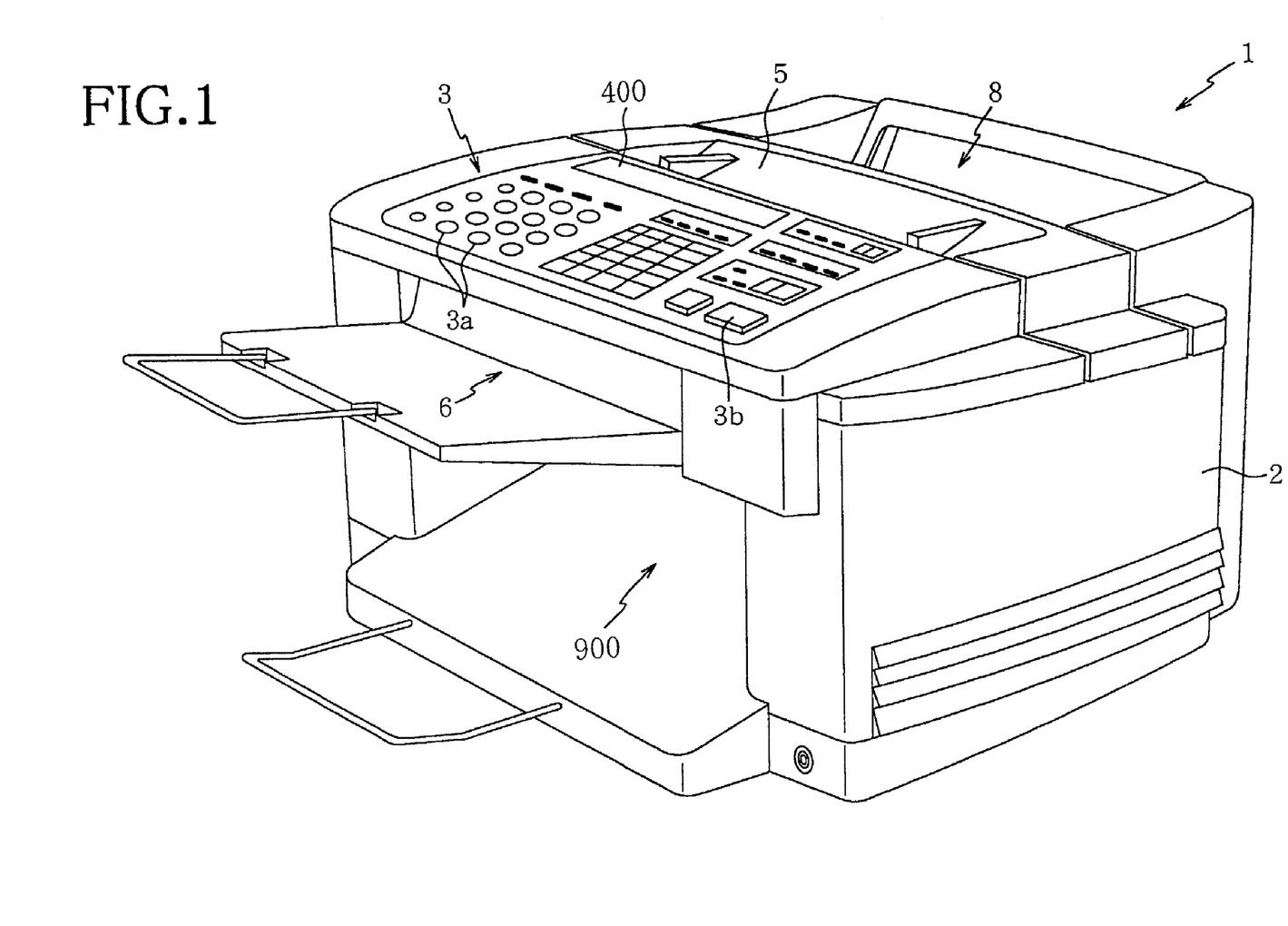
FIG. 1 is a perspective view of a multi-function peripheral device including a sheet feeder according to an exemplary embodiment of the invention.

An exemplary embodiment of the invention will be described in detail with reference to the accompanying drawings. FIG. 1 is a perspective view of a multi-function peripheral device 1 including a sheet feeder 10 (see FIG. 2) according to an exemplary embodiment of the invention. The multi-function peripheral device 1 includes various functions, such as facsimile functions, printer functions, scanner functions, copy functions, and video image capture functions.

As shown in FIG. 1, the multi-function peripheral device 1 has a device body 2 formed like a case. A control panel 3 is provided at an upper portion of the device body 2. The control panel 3 includes various buttons, such as numeric buttons 3a of numbers 0 through 9 and a start button 3b. Various operations may be performed as a user presses the buttons provided on the control panel 3. Provided at the rear side of the control panel 3 is a liquid crystal display (LCD) 400 that displays various information, such as setting conditions of the multi-function peripheral device 1 and operation messages, when required.

Provided at the rear side of the LCD 400 is a document setting portion 5 on which an original document, to be faxed to a remote facsimile machine using the facsimile functions or that is to be copied using the copying functions, may be stacked. The original document positioned on the document setting portion 5 is fed into the device body 2, and an image on the original document is read by a scanner (not shown).

Thereafter, the original document is further fed in a document feeding direction and discharged from a document discharge portion 6 provided below the control panel 3.

Provided at the rear side of the document setting portion 5 is a recording sheet holding portion 8, that is, a space for inserting a stack of recording sheets P thereinto. The recording sheets P inserted into the holding portion 8 are fed into the device body 2 by a sheet feeder 10, which will be described in detail below. After an image is printed by a printer (not shown) on the recording sheet P, the recording sheet P is discharged from a recording sheet discharge portion 900 provided below the document discharge portion 6.

Figure 2:
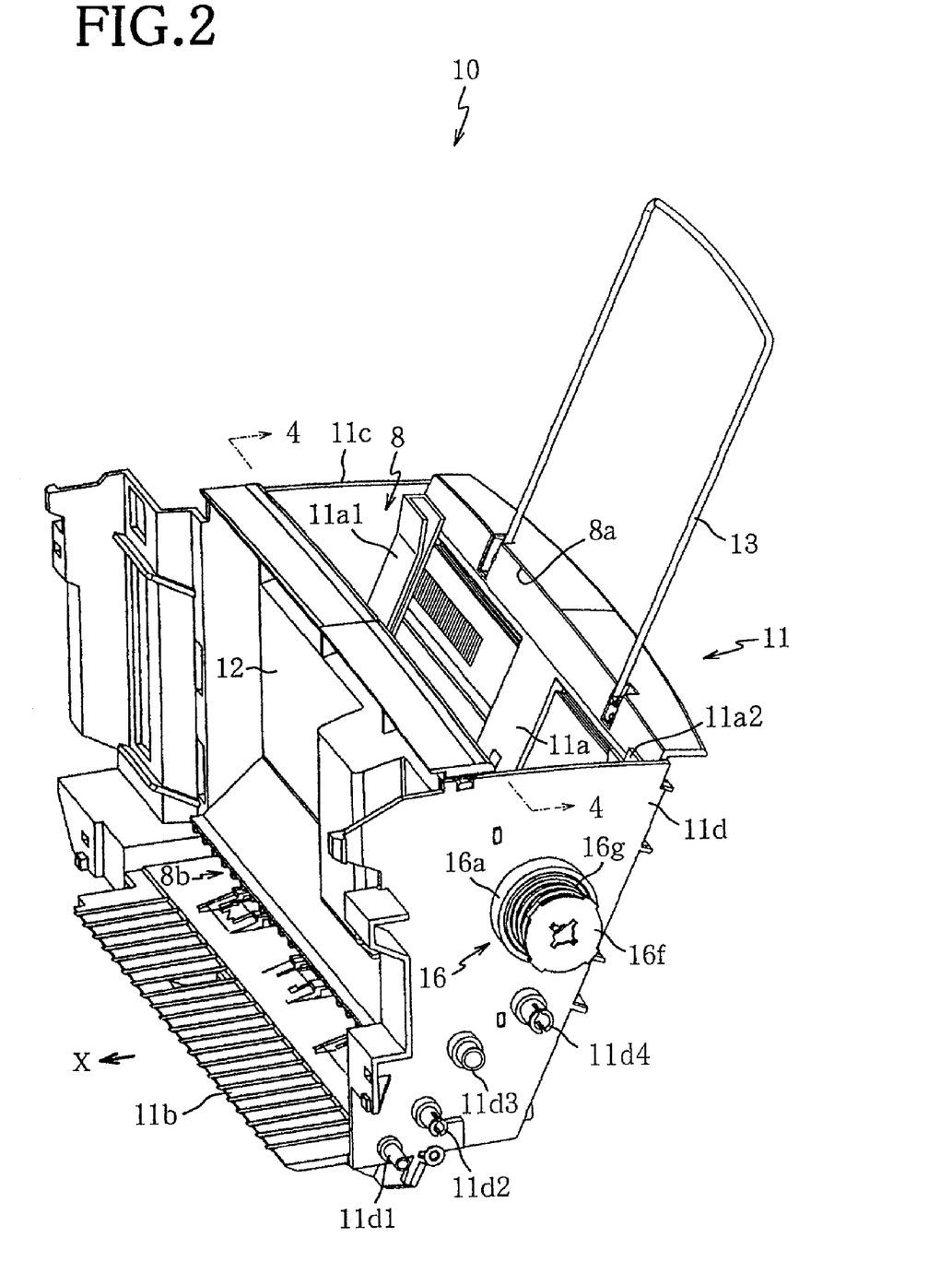
FIG. 2 is a perspective view of the sheet feeder that is mounted on the multi-function peripheral device.

FIG. 2 is a perspective view of the sheet feeder 10 that is mounted on the multi-function peripheral device 1. The arrow X in FIG. 2 shows a feeding direction of the recording sheet P. Connecting gears 17 through 21 (see FIG. 3) that transmit rotating force of a drive motor 100 (see FIG. 3) to a transmission gear 16a of a transmission unit 16 are omitted in FIG. 2.

As shown in FIG. 2, the sheet feeder 10 includes a frame 11 and a cover 12 that are received inside the device body 2, for holding the recording sheets P. The frame 11 and the cover 12 define the space of the recording sheet holding portion 8 into which the recording sheets P are inserted. The frame 11 includes a sheet positioning plate 11a, a guide plate 11b, and a pair of side wall plates 11c, 11d. The plates 11a through 11d are integrally formed of, for example, a resin material. The sheet positioning plate 11a supports a stack of the recording sheets P inserted into the recording sheet holding portion 8.

The sheet positioning plate 11a is provided at a rear portion (on the right side in FIG. 2) of the frame 11. A recording sheet supporting member 13 extends upwardly from the sheet positioning plate 11a. The recording sheet supporting member 13, made of a rod metal material, is formed into a substantially "U" shape. The recording sheet supporting member 13 supports upper ends of large-size recording sheets P inserted into the recording sheet holding portion 8, so that the upper ends of the large-size recording sheets P do not bend or hang down.

Figure 9:
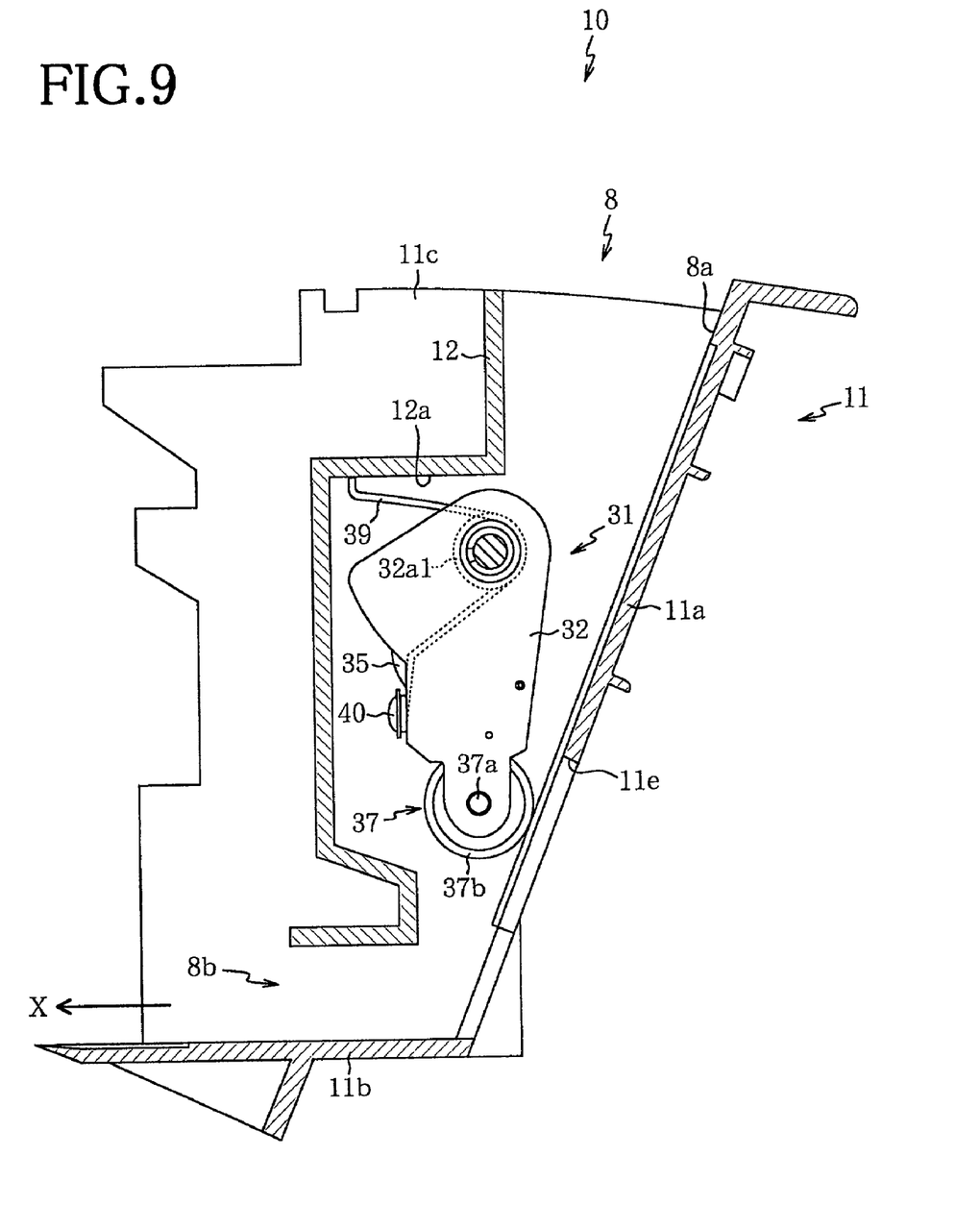
FIG. 9 is a cross-sectional view of the sheet feeder taken along line 9—9 of FIG. 4.
Figure 10A:
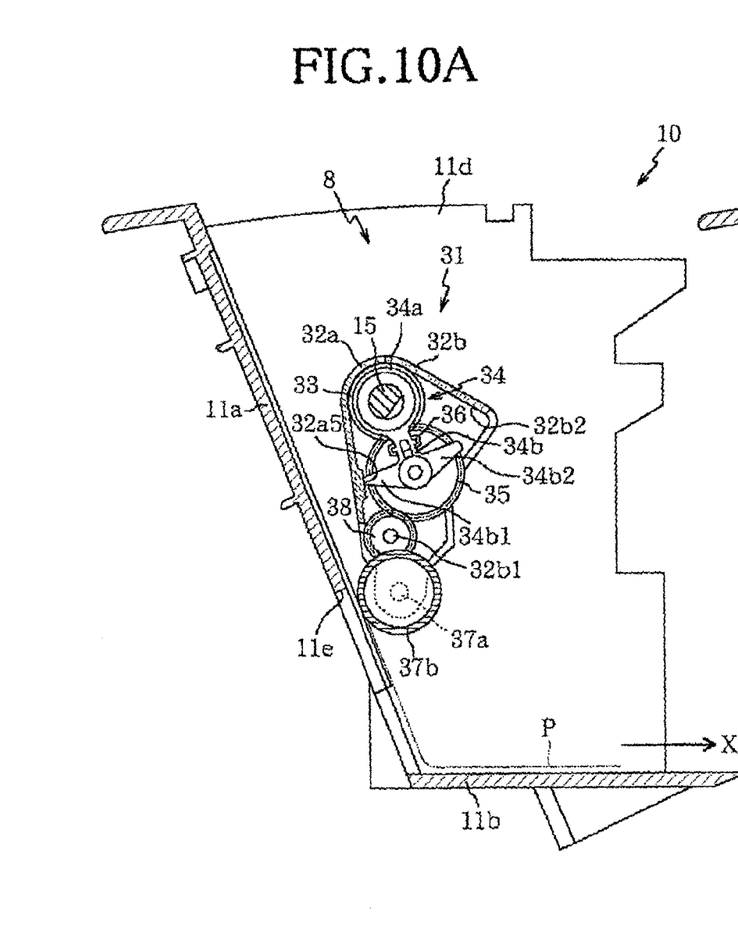
FIG. 10A is a cross-sectional side view of the sheet feeder with a pick-up roller of the pick-up roller unit contacting a sheet mounting plate.
Figure 10B:
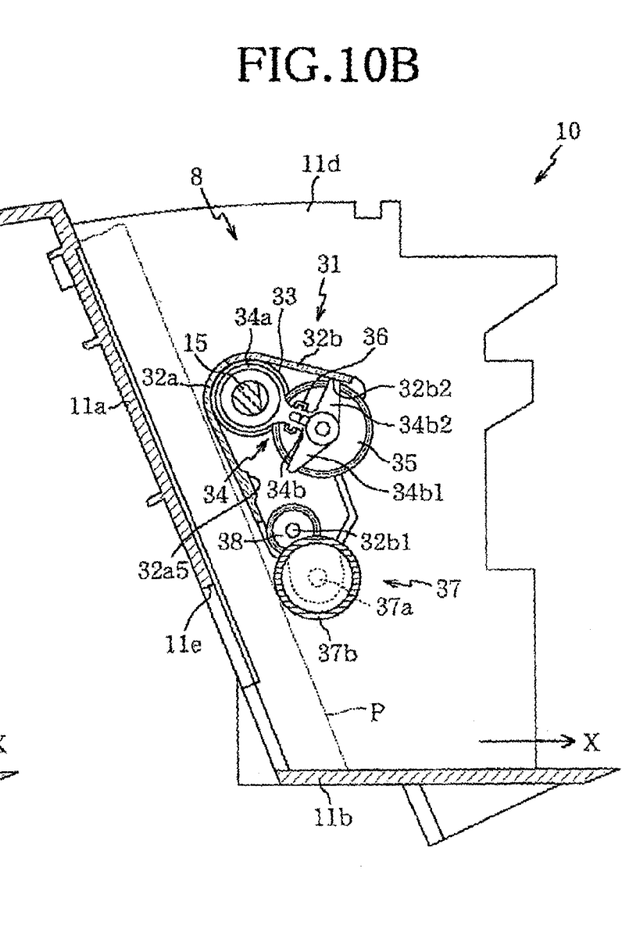
FIG. 10B is a cross-sectional side view of the sheet feeder with the pick-up roller separated from the sheet mounting plate.

The sheet positioning plate 11a is disposed in such a manner that an upper rear portion of the frame 11 (on the upper right side in FIG. 2) and a lower front portion thereof (on the left lower side in FIG. 2) are angled, i.e., the lower end of the sheet positioning plate 11a is connected to an end of the guide plate 11b (the right-side end thereof in FIG. 2) and the rear portion of the frame 11 has a rearward inclination relative to vertical (see FIGS. 9, 10A and 10B). The guide plate 11b guides the recording sheets P placed on the sheet positioning plate 11a, toward the printer (not shown) provided in the multi-function peripheral device 1. The guide plate 11b extends in a substantially horizontal direction from a portion thereof connected to the sheet positioning plate 11a toward a side where the printer (not shown) is provided (from the right side to the left side in FIG. 2). The recording sheets P placed on the sheet positioning plate 11a are guided in a substantially horizontal condition, along the upper surface of the guide plate 11b. A side wall plate of the pair of side wall plates 11c, 11d is disposed at each end of the sheet positioning plate 11a and the guide plate 11b in a width direction thereof.

The side wall plates 11c, 11d face each other, with a predetermined distance therebetween. Recording sheet guides 11a1, 11a2 are provided on the sheet positioning plate 11a near the side wall plates 11c, 11d, respectively. The recording sheet guides 11a1, 11a2 are connected by a rack (not shown) and a pinion (not shown) provided in the frame 11. It is known in the art that two recording sheet guides 11a1, 11a2 are connected by a rack and pinion and operated in linkage with each other so as to correspond to the width of the recording sheet P. Similarly, the recording sheet guides 11a1, 11a2, in this exemplary embodiment, are movable in linkage with each other in the width directions of the sheet positioning plate 11a, so as to correspond to the width of the recording sheet P. When the recording sheets P are placed on the sheet positioning plate 11a, the recording sheets P are inserted between a pair of the recording sheet guides 11a1, 11a2. The cover 12 is disposed at a predetermined distance from the sheet positioning plate 11a between inner facing surfaces of the side wall plates 11c, 11d. Each end of the cover 12, in the width direction, thereof is attached to the side wall plate 11c or 11d.

The recording sheet holding portion 8 is provided in the space defined by the sheet positioning plate 11a, the guide plate 11b, the side wall plates 11c, 11d of the frame 11 the cover 12. The recording sheet holding portion 8 is provided with a sheet supply opening 8a into which the recording sheets P may be inserted. A clearance is provided between the cover 12 and the guide plate 11b. A discharge opening 8b is provided in the clearance to discharge the recording sheets P inserted into the recording sheet holding portion 8 therefrom. The discharge opening 8b communicates with the inside of the recording sheet holding portion 8, so that the recording sheets P inserted into the recording sheet holding portion 8 can pass, one by one, through the discharge opening 8b.

Provided on an outer surface of the side wall plate lid (in the forward side in FIG. 2) is the transmission unit 16 that transmits the rotating force to a drive shaft 15, which will be described below in detail. Shafts 11d1 through 11d4, each having a substantially cylindrical shape, extend outwardly from the outer surface of the side wall plate 11d. The shafts 11d1 through 11d4 support the connecting gears 17 through 21. The shafts 11d1 through 11d4 are disposed in sequence in an upward direction from an lower end portion of the side wall plate 11d toward the transmission unit 16, and aligned substantially in a row.

Figure 3:
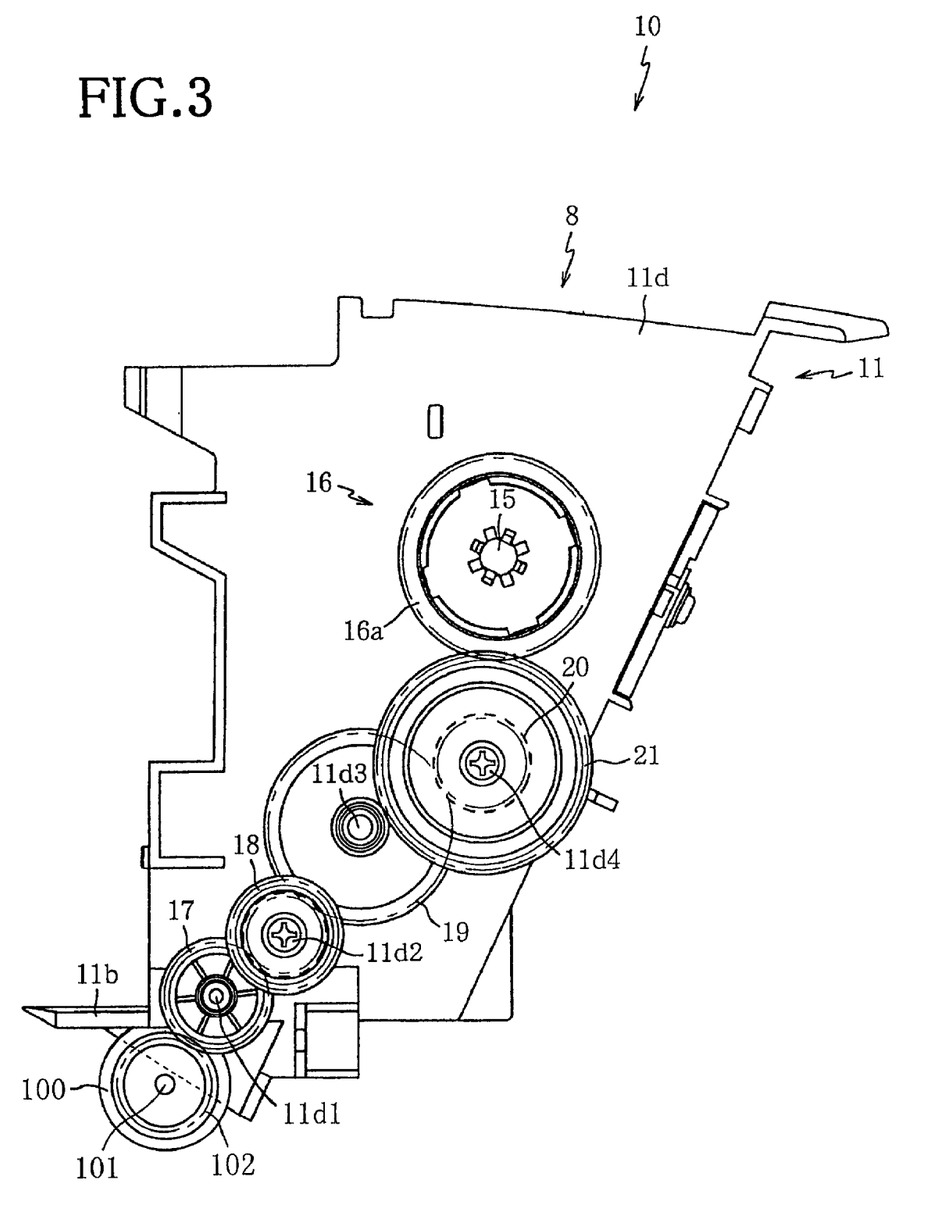
FIG. 3 is a side view of the sheet feeder.

FIG. 3 is a side view of the sheet feeder 10. In FIG. 3, alternate long and short dash lines show pitch circles of the pinion gear 102 and the connecting gears 17 through 21. The teeth of the connecting gears 17 through 21 provided on an outer periphery thereof are not shown in FIG. 3. As shown in FIG. 3, the shafts 11d1 through 11d4 protruding from the side wall plate 11d support five connecting gears 17 through 21 which are formed of, for example, a resin material into spur gears. The gear 17 supported by the shaft 11d1 is engaged with a pinion gear 102 mounted on the rotating shaft 101 of the drive motor 100 (drive unit).

The gear 17 is also engaged with the gear 18 supported by the shaft 11d2. The gear 18 is engaged with the gear 19 supported by the shaft 11d3. The gear 19 is engaged with the gear 20 supported by the shaft 11d4. The gear 20 is integrally and concentrically formed with the gear 21, so that the gears 20, 21 rotate together. The gear 21 is supported by the shaft 11d4, together with the gear 20. The gear 21 is engaged with the transmission gear 16a of the transmission unit 16.

Rotation of the rotating shaft 101 of the drive motor 100 is transmitted to the transmission gear 16a through the pinion gear 102 and the connecting gears 17 through 21. More specifically, as the rotating shaft 101 of the drive motor 100 is rotated, the rotation is transmitted to the pinion gear 102 and the connecting gears 17 through 21 in order. Thus, the pinion gear 102 and the connecting gears 17 through 21 are rotated. The rotation transmitted to the gear 21 is then transmitted to the transmission gear 16a engaged with the gear 21. Further, the rotation transmitted to the transmission gear 16a is transmitted to the drive shaft 15 through the transmission unit 16. Accordingly, the drive shaft 15 is rotated.

Figure 4:
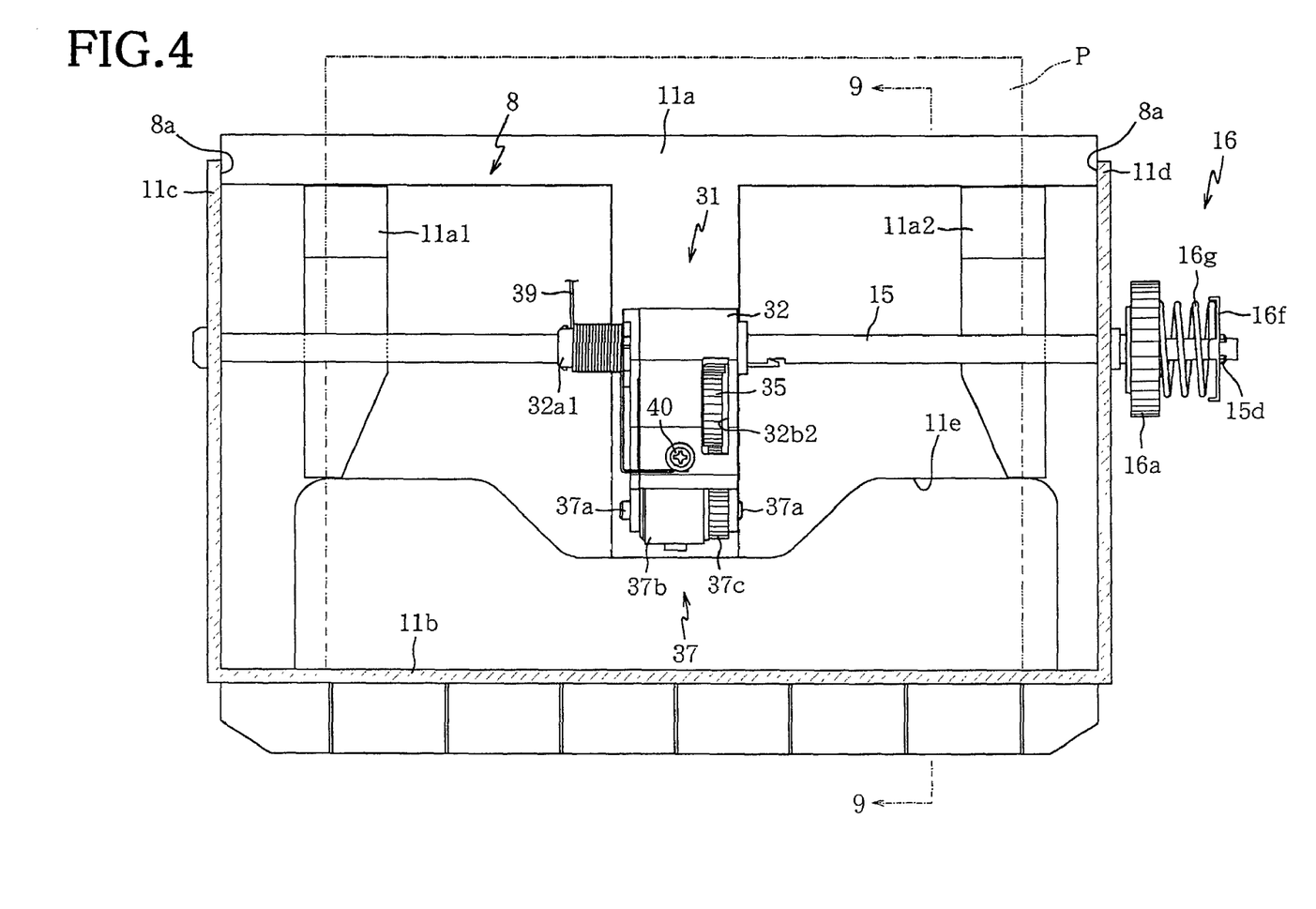
FIG. 4 is a cross-sectional view of the sheet feeder taken along line 4—4 of FIG. 2.

FIG. 4 is a cross-sectional view of the sheet feeder 10 taken along line 4—4 of FIG. 2. In FIG. 4, the shafts 11d1 through 11d4 and the connecting gears 17 through 21 provided on the side wall plate 1d are not shown. As shown in FIG. 4, a substantially "M"-shaped outlet 11e is disposed at a lower portion of the sheet positioning plate 11a. The outlet 11e is an opening through the sheet positioning plate 11a (in the direction perpendicular to the sheet of FIG. 4), as will be best seen in FIG. 9. The outlet 11e is provided to clear the recording sheet P when the paper jam occurs inside the sheet feeder 10, that is, in the recording sheet holding portion 8.

When the paper jam occurs inward from the sheet supply opening 8a of the recording sheet holding portion 8, a user has to manually remove the recording sheet P causing the paper jam from the recording sheet holding portion 8. However, the user will not be able to insert a hand into the recording sheet holding portion 8 through the narrow sheet supply opening 8a, in order to remove the recording sheet P causing the paper jam. In such a case, the user opens a rear cover (not shown) of the multi-function peripheral device 1 and removes the recording sheet P, causing the paper jam, from the recording sheet holding portion 8 through the outlet 11e by hand, from the back side of the sheet positioning plate 11a (from the right side in FIG. 9).

The pair of side wall plates 11c, 11d extend upwardly, with a predetermined distance therebetween, from each end of the sheet positioning plate 11a and the guide plate 11b in the width direction thereof (in the right and left-side directions in FIG. 4). An end of the drive shaft 15 is rotatably supported in each side wall plate 11c, 11d. The drive shaft 15 is a rotating shaft for transmitting the rotation of the drive motor 100, through the transmission unit 16, to a pick-up roller unit 31, which will be described in detail below. The drive shaft 15 is provided in parallel with the sheet positioning plate 11a, at a predetermined distance from the plate 11a (see FIG. 9). The recording sheets P are inserted into the recording sheet holding portion 8 between the drive shaft 15 and the sheet positioning plate 11a.

The transmission unit 16 (FIG. 5A) is provided at one end of the drive shaft 15 on the side of the wall plate 11d. The transmission unit 16 transmits the rotation (rotating force) of the drive motor 100 to the drive shaft 15. The transmission unit 16 includes the transmission gear 16a, transmission plates 16b, 16c, a spring holding plate 16f, and a compression spring 16g. As described above, the drive motor 100 is connected to the transmission gear 16a, via the pinion gear 102 and the connecting gears 17 through 21. The rotation of the drive motor 100 transmitted to the transmission gear 16a is then transmitted to the drive shaft 15, through the transmission unit 16. Thus, the drive shaft 15 is rotated.

Figure 5A:
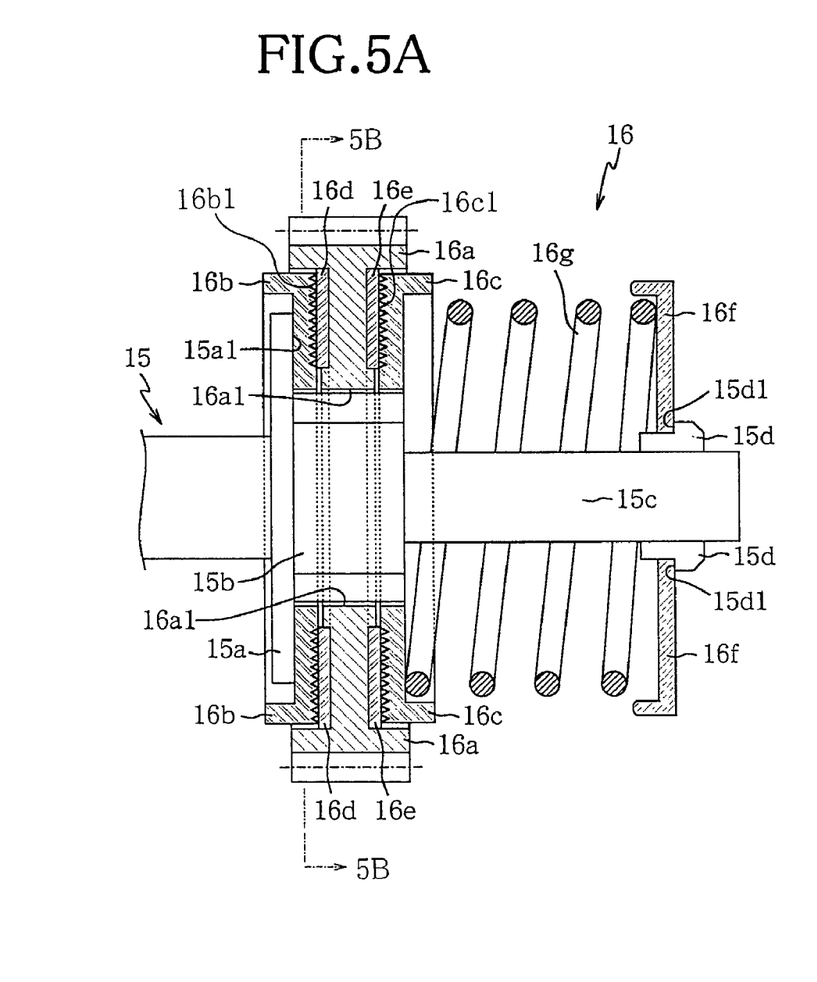
FIG. 5A is a cross-sectional view of a transmission unit of the sheet feeder.
Figure 5B:
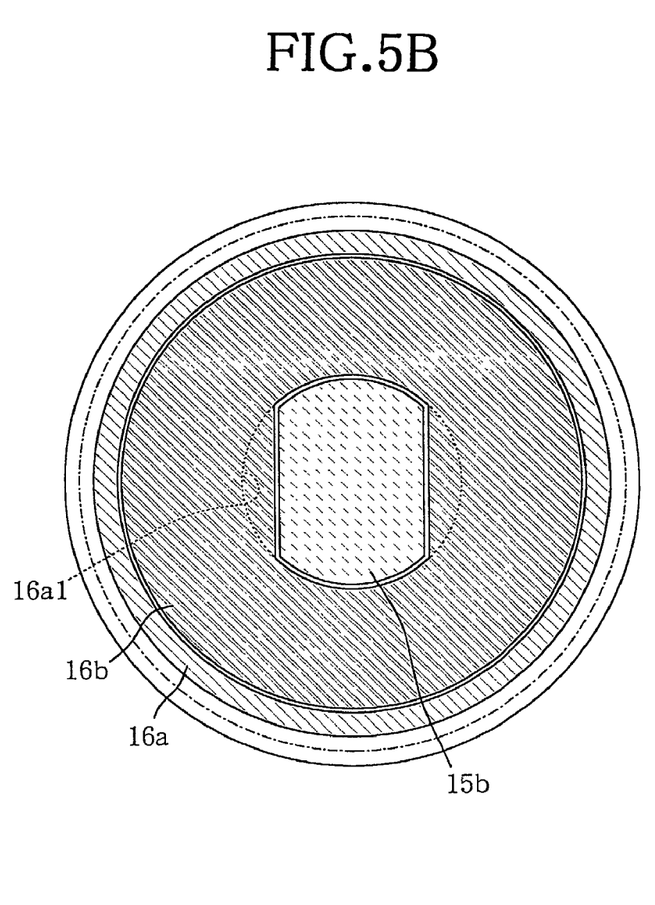
FIG. 5B is a cross-sectional view of the transmission unit taken along line 5B—5B of FIG. 5A.

Referring to FIGS. 5A and 5B, the transmission unit 16 will be described in detail below. FIG. 5A is a cross-sectional view of the transmission unit 16. FIG. 5B is a cross-sectional view of the transmission unit 16 taken along line 5B—5B of FIG. 5A. As shown in FIG. 5A, a flange 15a, a boss 15b, a spring holding portion 15c, and a stopper 15d are integrally formed at an end of the drive shaft 15 (the right side end thereof in FIG. 5A).

The flange 15a is shaped as substantially a disk concentric with the axis of the drive shaft 15. The flange 15a has a flange's stopper surface 15a1 on a side thereof (the right side in FIG. 5A). The boss 15b extends from the flange's stopper surface 15a1. As shown in FIG. 5B, the boss 15b has a substantially rectangular cross-sectional shape. More specifically, the cross-sectional shape of the boss 15b is formed into such a shape that two opposing portions of a circle, each of which has an arc or a bow shape, are cut out.

As shown in FIG. 5A, the spring holding portion 15c, which is substantially cylindrical, extends from an end surface of the boss 15b opposite to an end surface thereof close to the flange 15a. The stoppers 15d are provided so as to extend outwardly from an end of the spring holding portion 15c opposite to an end thereof close to the boss 15b. A stopper's surface 15d1 of each stopper 15d is formed so as to face the boss 15b. The stoppers' surfaces 15d1 restrict the movement of the spring holding plate 16f toward the right-side direction in FIG. 5A.

The transmission unit 16 includes the transmission gear 16a, the transmission plates 16b, 16c; friction sheets 16d, 16e; the spring holding plate 16f; and the compression spring 16g. The transmission gear 16a is formed of, for example, a resin material to form a spur gear. The transmission gear 16a has a hole in a substantially central portion thereof. An inner periphery 16a1 of the hole in the transmission gear 16a rotatably surrounds the boss 15b of the drive shaft 15. In other words, the transmission gear 16a is rotatably fitted over the boss 15b. The doughnut-shaped friction sheets 16d, 16e, made of non-woven cloth, are fitted on the right and left side of the transmission gear 16a. The doughnut-shaped transmission plates 16b, 16c formed of, for example, a resin material, are disposed on the right and left side of the transmission gear 16a having the friction sheets 16d, 16e fitted thereon. The boss 15b of the drive shaft 15 fits into an inner periphery of each of the transmission plates 16b, 16c.

The transmission plates 16b, 16c contact the friction sheets 16d, 16e, respectively, which are fitted on both sides of the transmission gear 16a. Each of the transmission plates 16b, 16c has a plurality of substantially "V"-shaped grooves 16b1, 16c1 when viewed from the side, on one side surface thereof which contacts the respective friction sheet 16d or 16e. The substantially "V"-shaped grooves 16b1, 16c1 of the transmission plates 16b, 16c are formed concentrically with the drive shaft 15. The "V"-shaped grooves 16b1, 16c1 enter into the respective friction sheets 16d, 16e. Thus, surface pressures of the transmission plates 16b, 16c with the respective friction sheets 16d, 16e are made uniform, and friction resistance of the contact surface between the transmission plates 16b, 16c and the friction sheets 16d, 16e are stabilized.

As shown in FIG. 5B, the inner periphery of each of the transmission plates 16b, 16c is formed into a substantially rectangular shape that fits over an outer periphery of the boss 15b of the drive shaft 15. With such a structure that the inner periphery of each of the transmission plates 16b, 16c fits over the outer periphery of the boss 15b, the transmission plates 16b, 16c rotate together with the drive shaft 15. Accordingly, the transmission plates 16b, 16c are rotated when the drive shaft 15 is rotated. The transmission gear 16a is formed into a doughnut shape with a diameter of the inner periphery 16a1 slightly larger than an outside diameter of the boss 15b, so that the transmission gear 16a may rotate freely relative to the boss 15b.

As shown in FIG. 5A, the spring holding plate 16f and the compression spring 16g are disposed to a side of the transmission plate 16c. The spring holding plate 16f holds the compression spring 16g together with the transmission plate 16c. The spring holding plate 16f is formed into a substantially doughnut shape. The spring holding plate 16f has substantially "L"-shaped bent sections at a rim thereof that are bent toward the transmission plate 16c. The bent sections prevent the compression spring 16g from moving out of position. The spring holding plate 16f hooks on the stoppers 15d extending from the spring holding portion 15c of the drive shaft 15. The stopper's surfaces 15d1 of the stoppers 15d restrict the movement of the spring holding plate 16f away from the transmission plate 16c (in the right side direction in FIG. 5A).

The compression spring 16g is disposed, between the transmission plate 16c and the spring holding plate 16f, in an elastically compressed condition. The spring holding portion 15c of the drive shaft 15 passes through an inner periphery of the compression spring 16g. The compression spring 16g urges the transmission gear 16a toward the flange 15a of the drive shaft 15. The left-side end and the right-side end of the compression spring 16g, in FIG. 5A, contact the transmission plate 16c and the spring holding plate 16f, respectively. The compression spring 16g urges the transmission plate 16c toward the flange 15a by elastic restoring force thereof. By the urging force of the compression spring 16g, the transmission plates 16b, 16c are pressed against the respective friction sheets 16d, 16e fitted on the transmission gear 16a. Thus, frictional force is applied to the contact surfaces between the friction sheets 16d, 16e and the transmission plates 16b, 16c. In this exemplary embodiment, the pressure applied by the compression spring 16g to the transmission plates 16b, 16c is 1.5 kgf/cm2.

When the rotating force transmitted to the transmission gear 16a is smaller than the frictional force generated on the contact surfaces between the friction sheets 16d, 16e and the transmission plates 16b, 16c, the transmission plates 16b, 16c are rotated together with the transmission gear 16a, through the frictional force. Because the inner periphery of each of the transmission plates 16b, 16c fits over the boss 15b of the drive shaft 15, the drive shaft 15 is rotated together with the transmission gear 16a and the transmission plates 16b, 16c without slip. When the rotating force transmitted to the transmission gear 16a is greater than the frictional force generated on the contact surfaces between the friction sheets 16d, 16e and the transmission plates 16b, 16c, each surface of the friction sheets 16d, 16e contacting the respective transmission plates 16b, 16c and each surface of the transmission plates 16b, 16c contacting the respective friction sheets 16d, 16e slidably move, so that the transmission gear 16a rotates freely relative to the drive shaft 15. Accordingly, the rotating force to be transmitted to the drive shaft 15 is restricted.

Referring back to FIG. 4, the pick-up roller unit 31 is supported in a substantially central portion of the drive shaft 15 in the direction of an axis thereof. The pick-up roller unit 31 feeds the recording sheets P placed on the sheet positioning plate 11a toward the guide plate 11b. The pick-up roller unit 31 includes a holder member 32 disposed in a substantially central portion of the drive shaft 15 in the direction of an axis thereof.

A spring winding portion 32a1 having a substantially tubular shape extends from a side of the holder member 32 (from the left side thereof in FIG. 4), while surrounding the drive shaft 15. The spring winding portion 32a1 is integrally formed with the holder member 32. The drive shaft 15 is rotatably surrounded by an inner periphery of the spring winding portion 32a1. An assisting spring 39 is wound around an outer periphery of the spring winding portion 32a1. An end of the assisting spring 39 is fixed on the holder member 32 by a screw 40.

Figure 6:
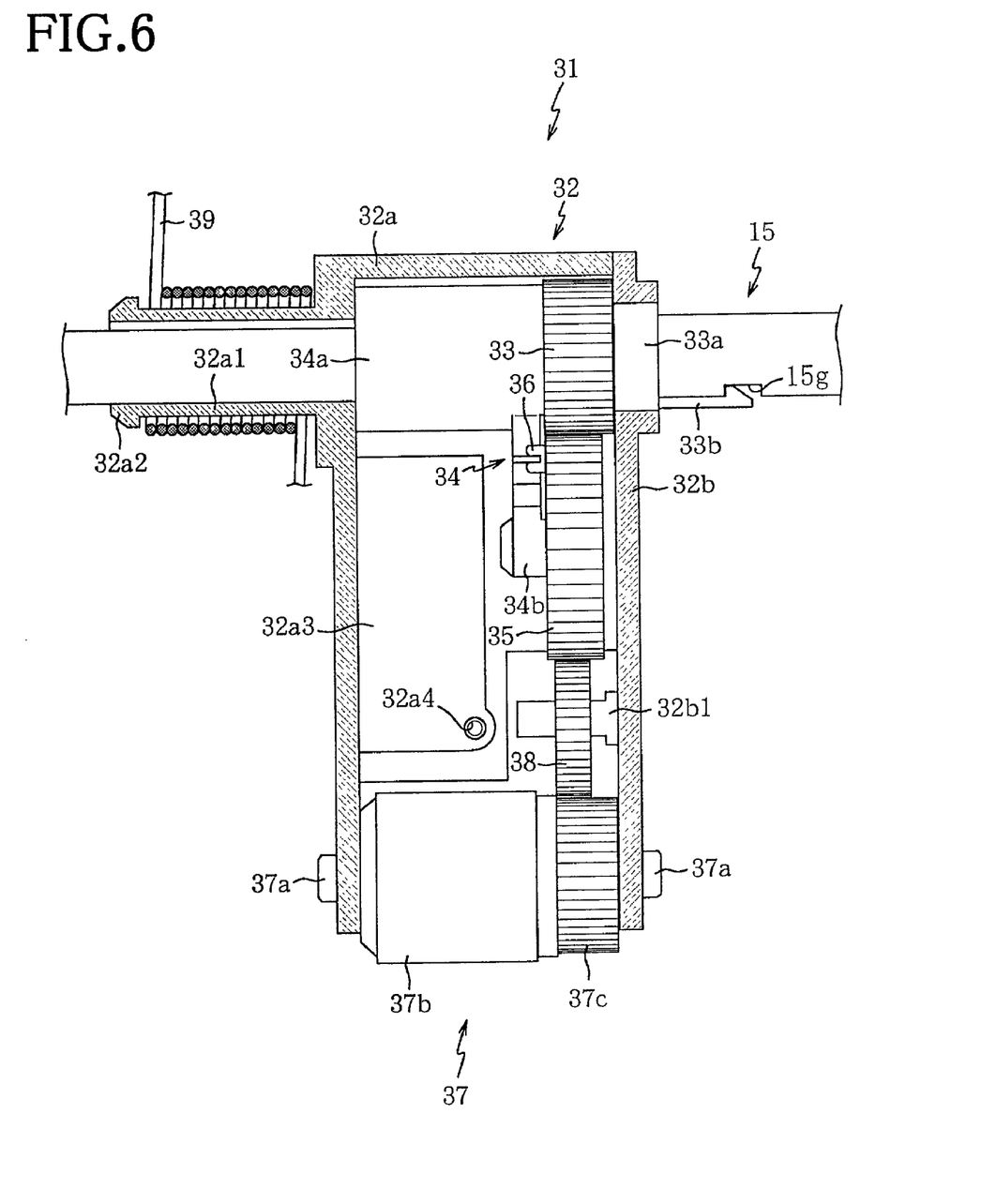
FIG. 6 is a cross-sectional view of a pick-up roller unit of the sheet feeder, illustrating internal structures thereof.

Referring to FIGS. 6 through 9, the pick-up roller unit 31 will be described in more detail. FIG. 6 is a cross-sectional view of the pick-up roller unit 31, illustrating the internal structures thereof. In FIG. 6, some parts of the assisting spring 39 are omitted. The pick-up roller unit 31 drives a pick-up roller 37 by the rotation of the drive shaft 15 and feeds the recording sheets P placed on the sheet positioning plate 11a toward the guide plate 11b.

As shown in FIG. 6, the pick-up roller unit 31 includes the holder member 32 having a substantially cross-sectional rectangular profile, a drive gear 33, an arm member 34, a clutch gear 35, a resisting member 36, the pick-up roller 37, and an interposed gear 38. The holder member 32, the drive gear 33, the arm member 34, the clutch gear 35, the resisting member 36, and the interposed gear 38 are provided between the drive shaft 15 and the pick-up roller 37, to transmit the rotation of the drive shaft 15 to the pick-up roller 37.

The holder member 32 is a framework of the pick-up roller unit 31. The holder member 32 includes a lower frame 32a and an upper frame 32b. The lower frame 32a is formed by a bottom part (the rearward side in FIG. 6), a left-side part (the left side in FIG. 6), and a top part (the upper side in FIG. 6) of the holder member 32. The upper frame 32b is formed by a front part (the forward side in FIG. 6) and a right-side part (the right side in FIG. 6) of the holder member 32.

The lower frame 32a is supported so as to move relative to the drive shaft 15. The spring winding portion 32a1 having a substantially tubular shape extends from a left side portion of the lower frame 32a in FIG. 6, while surrounding the drive shaft 15. Spring stopper protrusions 32a2 are provided at an end of the spring winding portion 32a1 to prevent the assisting spring 39 from coming off.

A mount portion 32a3 is disposed in an inner left side portion of the lower frame 32a. The mount portion 32a3 has a screw hole 32a4 recessed for attaching the lower frame 32a and the upper frame 36b with the screw 40. Disposed in a right upper portion of the holder member 32, in FIG. 6, is the drive gear 33 that surrounds and rotates with the drive shaft 15. The arm member 34 is disposed on the left side of the drive gear 33.

The arm member 34 includes a collar 34a that rotatably receives the drive shaft 15 therein, an arm 34b extends outwardly from the collar 34a. The clutch gear 35, that engages the drive gear 33, is rotatably mounted on an end of the arm 34b. The resisting member 36, that applies frictional resistance (load) to the clutch gear 35, is provided between the arm 34b and the clutch gear 35, to rotate the arm member 34 in association with the rotation of the drive gear 33.

Disposed at a lower portion of the holder member 32, in FIG. 6, is the pick-up roller 37 having a substantially cylindrical shape for feeding the recording sheets P. The pick-up roller 37 has substantially cylindrical roller shafts 37a extending from each end thereof. The pick-up roller 37 is rotatably supported by the roller shafts 37a in the holder member 32. The pick-up roller 37 includes a roller section 37b that contacts the recording sheets P and a gear section 37c that transmits the rotation of the drive shaft 15 to the roller section 37b. The roller section 37b is covered with a material having a high skin frictional resistance, such as silicone rubber, to prevent the roller section 37b from slipping on the recording sheet P when making contact therewith. The diameter of the gear section 37c is smaller than the diameter of the roller section 37b, so that the peripheral gear teeth surface of the gear section 37c does not make contact with the recording sheet P. The interposed gear 38 is disposed between the clutch gear 35 and the gear section 37c, to transmit the rotation of the drive shaft 15 to the roller section 37b. The interposed gear 38 is rotatably supported by a shaft 32b1 extending from the upper frame 32b. When the drive shaft 15 rotates in a predetermined direction, the clutch gear 35 is engaged with the interposed gear 38, so that the rotation of the drive shaft 15 is transmitted to the roller section 37b, through the gear section 37c. However, when the drive shaft 15 rotates in an opposite direction from the predetermined direction, the clutch gear 35 is disengaged from the interposed gear 38, so that rotation of the drive shaft 15 is not transmitted to the roller section 37b. Because the clutch gear 35 is disposed near the roller section 37b, the transmission and non-transmission of the rotating force to the roller section 37b are switched just before the roller section 37b. After one of the recording sheets P is picked up by the pick-up roller 37, the drive shaft 15 is rotated opposite to the feeding direction of the recording sheet P. At this time, the picked up recording sheet P is further conveyed in the recording sheet feeding direction X by feed rollers (not shown). While the picked up recording sheet P is conveyed in the recording feeding direction X, the pick-up roller 37 is rotated by the friction generated between the pick-up roller 37 and the recording sheet P. After the drive shaft 15 is rotated opposite to the feeding direction of the recording sheet P, only the interposed gear 38 is engaged with the pick-up roller 37, so that a mechanically applied load, such as friction generated by, for example, the shaft 32b1, the roller shaft 37a, the interposed gear 38, and the gear section 37c can be minimized. Therefore, back tension is reduced, leading to print quality improvement. More specifically, if a large back tension is applied, the load applied to the feed rollers is sharply changed at a time when a trailing edge of the recording sheet P, fed from the sheet positioning plate 11a in the recording sheet feeding direction X, comes out of contact with the pick-up roller 37. At this time, the sheet feeding amount is suddenly changed. Such changes in the sheet feeding amount cause adverse effects on print quality, such as a white streak, which will be highly noticeable especially in an ink-jet type recording apparatus employing a serial head.

Figure 7A:
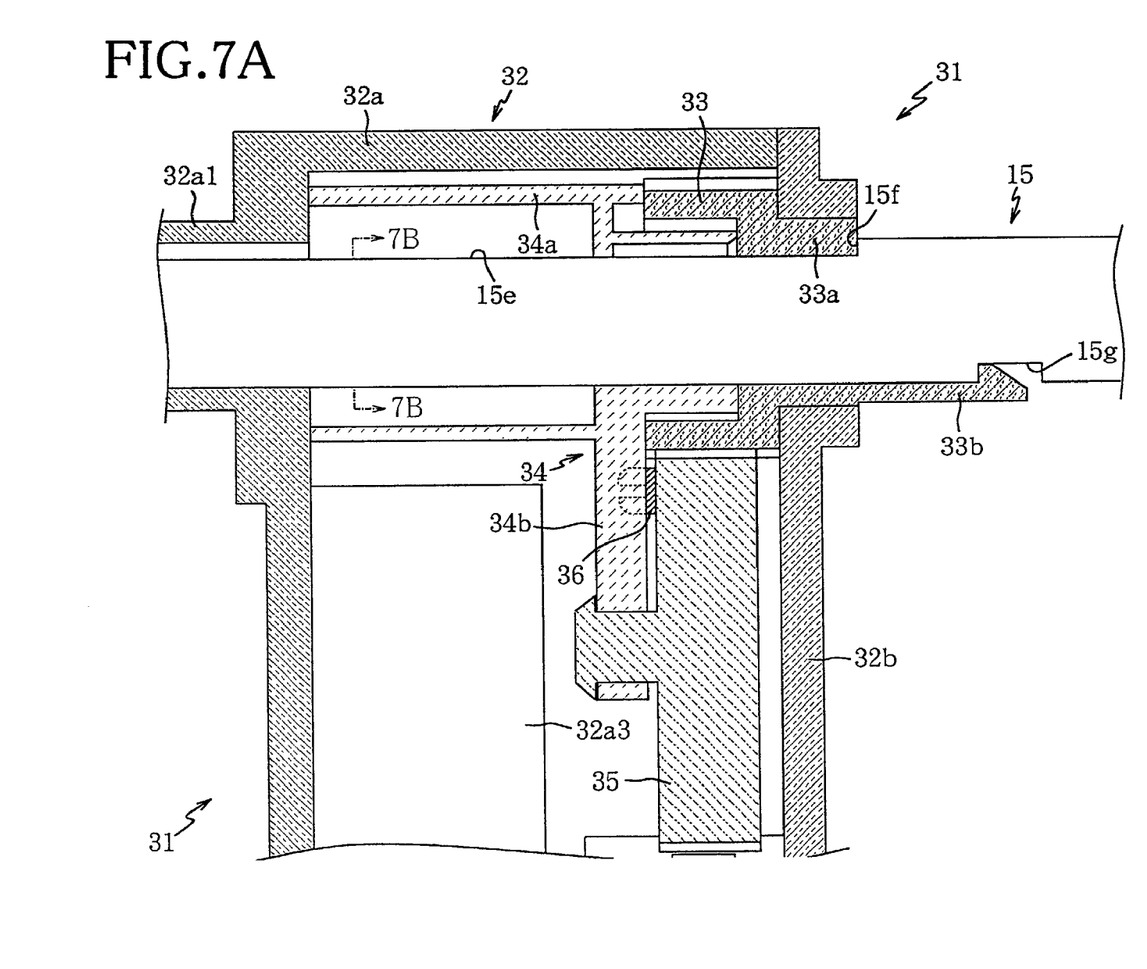
FIG. 7A is a partial enlarged cross-sectional view of the pick-up roller unit.
Figure 7B:
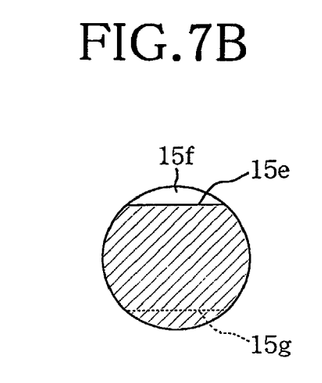
FIG. 7B is a cross-sectional view of a drive shaft taken along line 7B—7B of FIG. 7A.

FIG. 7A is a partial enlarged cross-sectional view of the pick-up roller unit 31. FIG. 7B is a cross-sectional view of the drive shaft 15 taken along line 7B—7B of FIG. 7A. In FIG. 7A, the assisting spring 39 wound around the outer periphery of the spring winding portion 32a1 is omitted.

As shown in FIG. 7A, the drive shaft 15 passes through the holder member 32 in a width direction thereof (the right and left directions in FIG. 7A). As shown in FIG. 7B, the drive shaft 15 is formed into a substantially "D" shape in cross section, with a part of the drive shaft 15 being cut flat. The drive shaft 15 has stopper faces 15e, 15f that stop the drive gear 33.

As shown in FIG. 7A, the drive shaft 15 is surrounded by the inner periphery of the drive gear 33. The drive gear 33 is integrally formed with a collar 33a that surrounds the drive shaft 15, and a stopper hook 33b that extends outwardly and rightwardly from the collar 33a. The collar 33a of the drive gear 33 is formed into a substantially tubular shape. The collar 33a is rotatably fitted into an opening on the right side of the upper frame 32b.

A right-side end surface of the collar 33a (FIG. 7A) contacts the stopper face 15f formed on the drive shaft 15. The stopper hook 33b extends outwardly from a right-side end surface of the collar 33a in FIG. 7A. A hook-shaped protrusion is formed at an end of the stopper hook 33b. The protrusion of the stopper hook 33b is received in a recess 15g formed with an outer periphery of the drive shaft 15 partially being cut out.

The right-side end of the collar 33a contacts the stopper face 15f of the drive shaft 15 and the end of the stopper hook 33b is received and retained in the recess 15g, so that the drive shaft 15 is fixed in position in the axial direction. The inner periphery of the drive gear 33 fits on the outer periphery of the drive shaft 15 where the stopper face 15e is formed, so that the drive gear 33 rotates together with the drive shaft 15.

The arm member 34 is disposed adjacent to a side end of the drive gear 33, which is opposite to a side end close to the stopper hook 33b. The arm member 34 has the tubular-shaped hollow collar 34a surrounding the drive shaft 15, close to a side end of the drive gear 33. An inner diameter of the collar 34a is formed slightly larger than an outer diameter of the drive shaft 15, so that drive shaft 15 is rotatably surrounded by the inner periphery of the collar 34a. The arm 34b extends outwardly (in the downward direction in FIG. 7A) from the outer surface of the collar 34a. The clutch gear 35 that engages with the drive gear 33 is rotatably supported at the end of the arm 34b.

The resisting member 36 is disposed between the arm 34b and the clutch gear 35. The resisting member 36 applies to the clutch gear 35 the frictional resistance (load) generated between the resisting member 36 and the clutch gear 35 by pressing a side surface of the clutch gear 35 and moves the arm member 34 in association of the rotation of the drive gear 33. The resisting member 36 is formed of an elastic material, such as a thin metal plate having an elastic characteristic. The resisting member 36 is attached to the arm 34b while elastically being deformed between the arm 34b and the clutch gear 35. The resisting member 36 urges a side surface of the clutch gear 35 by elastic restoring force thereof. Thus, the resisting member 36 applies the frictional resistance to the clutch gear 35 by the urging force.

When the rotating force transmitted from the drive gear 33 is smaller than the frictional resistance generated by the resisting member 36, the clutch gear 35 is not rotated by the drive gear 33 but pivotally moves about the drive shaft 15 together with the arm 34b of the arm member 34 in synchronization with the rotation of the drive gear 33. When the rotating force transmitted from the drive gear 33 is larger than the frictional resistance generated by the resisting member 36, the clutch gear 35 is rotated by the drive gear 33 against the frictional resistance generated by the resisting member 36.

Each side surface of the collar 34a of the arm member 34 contacts an inner side surface of the lower frame 32a or a left side surface of the drive gear 33 where the teeth are provided. The teeth of the drive gear 33 provided on a right side surface thereof contact an inner side surface of the upper frame 32b. The drive gear 33 is positioned, by retaining the stopper hook 33b in the recess 15g and by contacting the collar 33a to the stopper face 15f, with respect to the axial direction of the drive shaft 15. Thus, the pick-up roller unit 31 is fixedly positioned in a substantially central, axial portion of the drive shaft 15.

Figure 8:
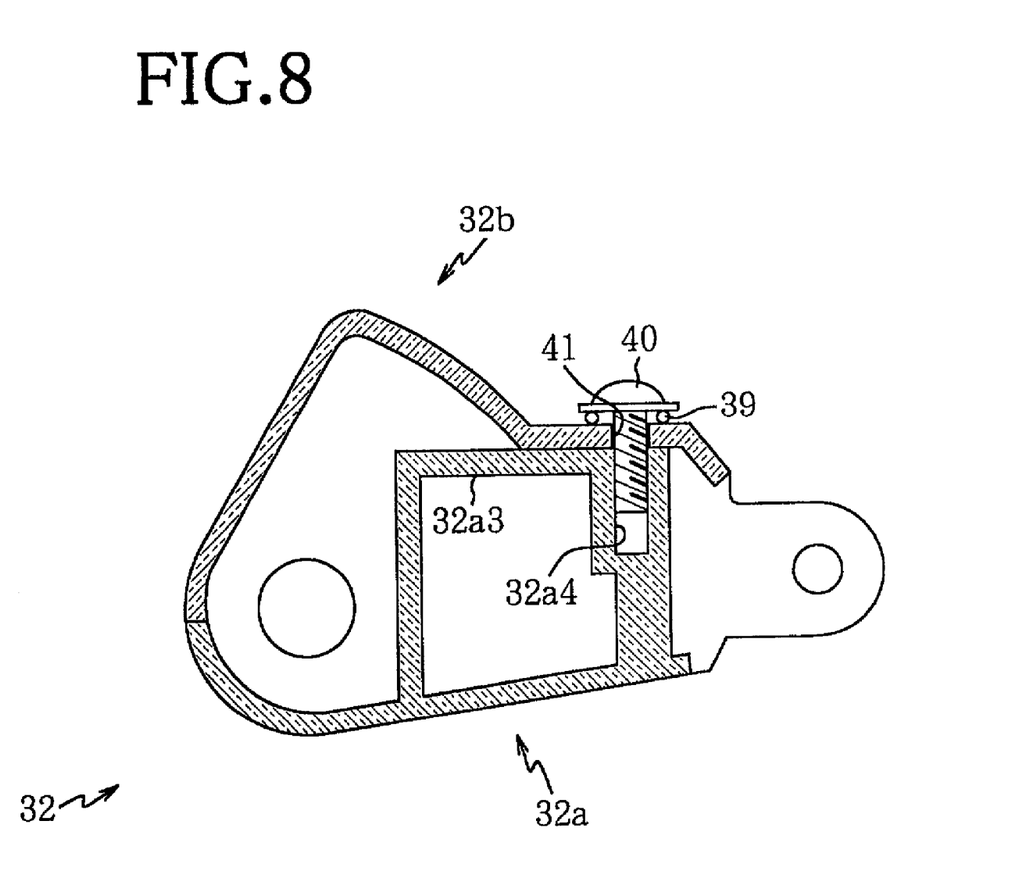
FIG. 8 is a cross-sectional side view of a holder member of the pick-up roller unit.

FIG. 8 is a cross-sectional side view of the holder member 32 of the pick-up roller unit 31. As shown in FIG. 8, the mount portion 32a3 having a generally rectangular cross-sectional shape is disposed above the bottom surface of the lower frame 32a. The mount portion 32a3 supports a portion of the upper frame 32b, which is combined with the lower frame 32a. An upper surface of the mount portion 32a3 in FIG. 8 contacts the upper frame 32b. The screw hole 32a4, into which the screw 40 of an internal screw is screwed, is provided on a surface of the mount portion 32a3 that contacts the upper frame 32b.

A through hole 41 whose lateral cross section has a substantially circular shape is provided on a surface of the upper frame 32b that contacts the mount portion 32a3, so as to correspond to the position where the screw hole 32a4 is provided. The screw 40 is inserted into the through hole 41 and screwed into the screw hole 32a4 provided on the lower frame 32a. Thus, the upper frame 32b is fixed on the lower frame 32a with the screw 40.

An end of the assisting spring 39 is held between a head of the screw 40 and the upper frame 32b. The end of the assisting spring 39 is fixed together with the lower frame 32a and the upper frame 32b by the screw 40. The operation of attaching the end of the assisting spring 39 to the pick-up roller unit 31 is performed together with the operation of combining the lower frame 32a with the upper frame 32b. Because the assisting spring 39 is fixed on the holder member 32 with the screw 40 that fixes the upper frame 32b and the lower frame 32a together, another screw for fixing the assisting spring 39 onto the holder member 32 does not have to be separately provided.

FIG. 9 is a cross-sectional view of the sheet feeder 10 taken along line 9—9 of FIG. 4. The arrow X indicates the feeding direction of the recording sheets P. As shown in FIG. 9, the pick-up roller unit 31 is supported by the drive shaft 15 in the recording sheet holding portion 8 defined by the sheet positioning plate 11a and the cover 12. The drive shaft 15 is provided at a predetermined distance away from the sheet positioning plate 11a. As described above, the assisting spring 39 is wound around the spring winding portion 32a1 of the pick-up roller unit 31. An end of the assisting spring 39 is fixed on the holder member 32 by the screw 40. The other end of the assisting spring 39 is stopped at an inner upper surface of an accommodating portion 12a of the cover 12 while contacting thereto in an elastically deformed condition. The assisting spring 39 urges the pick-up roller unit 31 toward the sheet positioning plate 11a with the pivotal movement of the pick-up roller unit 31 about the drive shaft 15. With such a structure, the pick-up roller 37 of the pick-up roller unit 31 is pressed against the sheet positioning plate 11a, so that the pick-up roller 37 is brought into intimate contact with the recording sheets P.

The cover 12 is provided to a side of the pick-up roller unit 31 opposite from a side to which the sheet positioning plate 11a is disposed. The recessed or concave accommodating portion 12a is provided on a side of the cover 12 that faces the pick-up roller unit 31. The accommodating portion 12a accommodates the pick-up roller unit 31 as the unit 31 pivotally moves about the drive shaft 15 toward the cover 12. With this structure, the sheet feeder 10 may be reduced in size in the feeding direction of the recording sheet P (the left and right directions in FIG. 9).

FIG. 10A is a cross-sectional side view of the sheet feeder 10 with the pick-up roller 37 contacting the sheet positioning plate 11a. FIG. 10B is a cross-sectional side view of the sheet feeder 10 with the pick-up roller 37 separated from the sheet positioning plate 11a. The pitch circle of each of the clutch gear 35 and the interposed gear 38 is indicated by alternate dash and dot lines in FIGS. 10A and 10B.

Teeth of the clutch gear 35 and the interposed gear 38 are not shown in FIGS. 10A and 10B.

As shown in FIGS. 10A and 10B, the arm 34b of the arm member 34 is formed into a substantially "T" shape when viewed from the side. The clutch gear 35 is rotatably supported by a shaft at an end of the arm 34b extending from the collar 34a of the arm member 34. Stopper sections 34b1, 34b2 extend outwardly, from a portion where the clutch gear 35 is supported by the shaft, in the radius direction of the gear 35, forming a substantially straight line. When the arm 34b of the arm member 34 rotates in the clockwise direction in FIG. 10B, an end of the stopper section 34b1 contacts a bottom surface 32a5 of the lower frame 32a, as shown in FIG. 10A. When the arm 34b of the arm member 34 rotates in the counterclockwise direction in FIG. 10A, an end of stopper section 34b2 contacts an upper surface 32b2 of the upper frame 32b, as shown in FIG. 10B.

The stopper sections 34b1, 34b2 protrude outside of an addendum circle of the clutch gear 35. Therefore, when the stopper sections 34b1 and 34b2 contact the bottom surface 32a5 and the upper surface 32b2, respectively, the teeth of the clutch gear 35 do not contact the holder member 32. Accordingly, damage to the teeth of the clutch gear 35 is prevented.

When the clutch gear 35, shown in FIG. 10A, is moved with the arm member 34 in the counterclockwise direction to a position shown in FIG. 10B, the clutch gear 35 and the interposed gear 38 are separated and disengaged from each other. When the clutch gear 35, shown in FIG. 10B, is moved with the arm member 34 in the clockwise direction to a position shown in FIG. 10A, the clutch gear 35 and the interposed gear 38 are engaged with each other. Therefore, the rotation of the clutch gear 35 is transmitted to the interposed gear 38 to rotate the pick-up roller 37.

The operations of above-structured pick-up roller unit 31 will be described. When the drive shaft 15 is rotated through the transmission unit 16 in the clockwise direction in FIG. 10B, the drive gear 33 is rotated together with the drive shaft 15 in the clockwise direction. The rotation of the drive gear 33 is transmitted to the clutch gear 35 engaged therewith. The clutch gear 35 is pivotally moved about the drive shaft 15 toward the interposed gear 38 (the clockwise direction in FIG. 10B), together with the arm 34b of the arm member 34, which is moved by the frictional resistance generated by the resisting member 36, in association with the rotation of the drive gear 33. With the movement, the clutch gear 35 is moved to the position shown in FIG. 10A where the clutch gear 35 is engaged with the interposed gear 38. At this time, the end of the stopper section 34b1 contacts the bottom surface 32a5 of the lower frame 32a, so that the movement of the clutch gear 35 toward the interposed gear 38 is restricted. Therefore, the clutch gear 35 and the interposed gear 38 are always engaged with each other at a predetermined position. This enables the smooth transmission of the rotating force of the clutch gear 35 to the interposed gear 38.

As the drive shaft 15 is further rotated after the stopper section 34b1 contacts the bottom surface 32a5, the clutch gear 35 is rotated by the drive gear 33 rotating together with the drive shaft 15, against the frictional resistance generated by the resisting member 36. The rotation of the clutch gear 35 is transmitted to the interposed gear 38 engaged therewith. The rotation of the interposed gear 38 is then transmitted to the gear section 37c of the pick-up roller 37. Thus, the roller section 37b is rotated in the counterclockwise direction in FIG. 10A. The recording sheet P is fed in the feeding direction X (indicated by the arrow in FIG. 10A).

The clutch gear 35 is positioned to a side of the interposed gear 38 farther from the sheet positioning plate 11a (the upper left side in FIG. 10A). As the clutch gear 35 is rotated by the drive gear 33 after being engaged with the interposed gear 38, the arm member 34 tends to move toward the lower frame 32a by the rotating force of the drive gear 33, so that the lower frame 32a is pressed toward the sheet positioning plate 11a by the stopper section 34b1 of the arm member 34. Consequently, the pick-up roller 37 supported by the holder member 32 is pressed toward the sheet positioning plate 11a. This structure prevents the pick-up roller 37 from moving away from the recording sheets P when the recording sheets P are fed by the pick-up roller 37. Accordingly, the recording sheets P may be smoothly fed.

When the drive shaft 15 is rotated in the counterclockwise direction in FIG. 10A, the drive gear 33 is rotated together with the drive shaft 15 in the counterclockwise direction in FIG. 10A. The rotation of the drive gear 33 is transmitted to the clutch gear 35 engaged therewith. The clutch gear 35 is pivotally moved about the drive shaft 15 in the counterclockwise direction in FIG. 10A, together with the arm 34b of the arm member 34, which is moved by the frictional resistance generated by the resisting member 36, in association with the rotation of the drive gear 33. With the movement, the clutch gear 35 is separated from the interposed gear 38 and moved to the position shown in FIG. 10B. As the clutch gear 35 is disengaged from the interposed gear 38, the pick-up roller 37 can rotate freely in the clockwise direction in FIG. 10B. Therefore, the recording sheets P inserted between the pick-up roller 37 and the sheet positioning plate 11a into the recording sheet holding portion 8 may readily be taken out.

As the arm member 34 moves in the counterclockwise direction in FIG. 10A, the end of the stopper section 34b2 contacts the upper surface 32b2 of the upper frame 32b, as shown in FIG. 10B. Thus, the movements of the arm member 34 and the clutch gear 35 in the counterclockwise direction may be restricted. As the drive shaft 15 is further rotated in the counterclockwise direction after the end of the stopper section 34b2 contacts the upper surface 32b2, the arm member 34 presses the upper frame 32b upwardly with the stopper section 34b2 by the rotating force of the drive gear 33, so that the upper frame 32b is pivotally moved about the drive shaft 15 in the counterclockwise direction. Thus, the pick-up roller 37 is moved away from the sheet positioning plate 11a, as shown in FIG. 10B. In this state, a new set of the recording sheets P may readily be inserted between the pick-up roller 37 and the sheet positioning plate 11a into the recording sheet holding portion 8.

As described above, in the sheet feeder 10 according to the exemplary embodiment, when the rotating force transmitted to the transmission gear 16a is greater than the frictional force generated on the contact surfaces between the friction sheets 16d, 16e and the transmission plates 16b, 16c, each surface of the friction sheets 16d, 16e contacting the respective transmission plates 16b, 16c and each surface of the transmission plates 16b, 16c contacting the respective friction sheets 16d, 16e slidably move, so that the transmission gear 16a rotates freely relative to the drive shaft 15. Accordingly, the rotating force to be transmitted to the drive shaft 15 is restricted. In other words, by the slidable movement of the friction sheets 16d, 16e and the transmission plates 16b, 16c, that is, by the rotation of the transmission gear 16a relative to the drive shaft 15, the rotating force (torque) greater than the frictional force generated on the contact surfaces between the friction sheets 16d, 16e and the transmission plates 16b, 16c is not transmitted to the drive shaft 15.

For example, when rotating loads applied to the drive gear 33, the clutch gear 35, the interposed gear 38, the pick-up roller 37, and the drive shaft 15 are increased due to the paper jams, the drive motor 100 tends to increase the rotating force to be transmitted to the transmission gear 16a in order to rotate the drive shaft 15. However, when such rotating force becomes greater than the frictional force generated on the contact surfaces between the friction sheets 16d, 16e and the transmission plates 16b, 16c, the transmission gear 16a may rotate freely relative to the drive shaft 15. Thus, the rotating force to be transmitted to the drive shaft 15 may be restricted by the transmission gear 16a.

With the above-described structures, the application of the excessive rotating force to the drive shaft 15, the gears 33, 35, 38, and the pick-up roller 37 can be prevented. Accordingly, damage to the drive shaft 15, the gears 33, 35, 38, and the pick-up roller 37 can be prevented. In addition, the application of excessive loads to the drive motor 100 and the connecting gears 17 through 21 can be prevented by freely rotating the transmission gear 16a relative to the drive shaft 15. Therefore, acoustic noises generated when the drive motor 100 is in abnormal driving conditions, and a malfunction of the motor 100 can be prevented.

While the invention has been described with reference to the exemplary embodiment, it is to be understood that the invention is not restricted to the particular forms shown in the foregoing exemplary embodiment. Various modifications and alterations can be made thereto without departing from the scope of the invention.

What is claimed is:

1. A sheet feeder, comprising:
   a sheet holding member that holds a sheet;
   a pick-up roller that feeds the sheet held by the sheet holding member;
   a holder member that rotatably supports the pick-up roller;
   a drive shaft that supports the holder member and is directly or indirectly connected to the pick-up roller;
   a frame member that rotatably supports each end of the drive shaft in a direction of an axis thereof;
   a drive unit that applies rotating force to the drive shaft supported by the frame member;
   a transmission member that surrounds an end of the drive shaft in the direction of the axis thereof and transmits the rotating force applied by the drive unit thereto; and
   a pressing member that presses the transmission member to the drive shaft with predetermined frictional force.

2. The sheet feeder according to claim 1, wherein the drive shaft has a contact surface that is provided on one end thereof in the direction of the axis thereof adjacent to the transmission member and contacts to a side surface of the transmission member, and the pressing member has an urging member that urges the transmission member toward the contact surface.

3. The sheet feeder according to claim 2, wherein the holder member includes a clutch member that is disposed between the drive shaft and the pick-up roller and that connects the drive shaft and the pick-up roller when the drive shaft supporting the holder member is rotated in a first direction, and disconnects the drive shaft and the pick-up roller when the drive shaft is rotated in an opposite direction from the first direction.

4. The sheet feeder according to claim 3, wherein the clutch member includes:
   a first gear that is connected to the pick-up roller;
   a second gear that is provided on the drive shaft apart from the first gear and rotates together with the drive shaft;
   an arm member that has a collar section which rotatably inserts thereinto the drive shaft having the second gear and a protruding section which extends outwardly from the collar section and moves to a side to which the first gear is provided or an opposite side therefrom;

a clutch gear that is rotatably supported by the protruding section of the arm member and engaged with the second gear; and a resisting member that applies a load to the clutch gear to move the arm member in association with rotation of the second gear engaged with the clutch gear.

5. The sheet feeder according to claim 4, wherein the first gear is disposed toward the sheet holding member with respect to the clutch gear supported by the protruding section of the arm member and engages with the clutch gear as the protruding section of the arm member is moved toward the sheet holding member.

6. The sheet feeder according to claim 4, wherein the holder member includes a restriction member that restricts a movement of the arm member toward the first gear when the clutch gear is engaged with the first gear.

7. The sheet feeder according to claim 2, wherein the holder member includes a clutch member that is disposed between the drive shaft and the pick-up roller, and that connects the drive shaft and the pick-up roller when the drive shaft is rotated in the first direction, and moves the holder member toward a side opposite to the sheet holding member when the drive shaft is rotated in the opposite direction from the first direction by transmitting the rotating force of the drive shaft to the holder member.

8. The sheet feeder according to claim 7, wherein the first gear is disposed toward the sheet holding member with respect to the clutch gear supported by the protruding section of the arm member and engages with the clutch gear as the protruding section of the arm member is moved toward the sheet holding member.

9. The sheet feeder according to claim 7, wherein the holder member includes a restriction member that restricts movement of the arm member toward the first gear when the clutch gear is engaged with the first gear.

10. The sheet feeder according to claim 7, wherein the clutch member includes:

a first gear that is connected to the pick-up roller;

a second gear that is provided on the drive shaft apart from the first gear and rotates together with the drive shaft;

an arm member that has a collar section which rotatably inserts thereinto the drive shaft having the second gear and a protruding section which extends outwardly from the collar section and moves to a side to which the first gear is provided or an opposite side therefrom;

a clutch gear that is rotatably supported by the protruding section of the arm member and engaged with the second gear;

a resisting member that applies load to the clutch gear to move the arm member in association with rotation of the second gear engaged with the clutch gear; and a holder frame that supports the pick-up roller disposed in the holder member and that is moved by the arm member to the opposite side from the side to which the first gear is provided.

11. The sheet feeder according to claim 10, wherein the first gear is disposed toward the sheet holding member with respect to the clutch gear supported by the protruding section of the arm member and engages with the clutch gear as the protruding section of the arm member is moved toward the sheet holding member.

12. The sheet feeder according to claim 10, wherein the holder member includes a restriction member that restricts movement of the arm member toward the first gear when the clutch gear is engaged with the first gear.

13. The sheet feeder according to claim 1, wherein the holder member includes a clutch member that is disposed between the drive shaft and the pick-up roller, and that connects the drive shaft and the pick-up roller when the drive shaft is rotated in the first direction, and moves the holder member toward a side opposite to the sheet holding member when the drive shaft is rotated in the opposite direction from the first direction by transmitting the rotating force of the drive shaft to the holder member.

14. The sheet feeder according to claim 13, wherein the clutch member includes:

a first gear that is connected to the pick-up roller;

a second gear that is provided on the drive shaft apart from the first gear and rotates together with the drive shaft;

an arm member that has a collar section which rotatably inserts thereinto the drive shaft having the second gear and a protruding section which extends outwardly from the collar section and moves to a side to which the first gear is provided or an opposite side therefrom;

a clutch gear that is rotatably supported by the protruding section of the arm member and engaged with the second gear;

a resisting member that applies load to the clutch gear to move the arm member in association with rotation of the second gear engaged with the clutch gear; and a holder frame that supports the pick-up roller disposed in the holder member and that is moved by the arm member to the opposite side from the side to which the first gear is provided.

15. The sheet feeder according to claim 14, wherein the first gear is disposed toward the sheet holding member with respect to the clutch gear supported by the protruding section of the arm member and engages with the clutch gear as the protruding section of the arm member is moved toward the sheet holding member.

16. The sheet feeder according to claim 14, wherein the holder member includes a restriction member that restricts a movement of the arm member toward the first gear when the clutch gear is engaged with the first gear.

17. The sheet feeder according to claim 13, wherein the first gear is disposed toward the sheet holding member with respect to the clutch gear supported by the protruding section of the arm member and engages with the clutch gear as the protruding section of the arm member is moved toward the sheet holding member.

18. The sheet feeder according to claim 13, wherein the holder member includes a restriction member that restricts movement of the arm member toward the first gear when the clutch gear is engaged with the first gear.

19. The sheet feeder according to claim 1, wherein the holder member includes a clutch member that is disposed between the drive shaft and the pick-up roller and that connects the drive shaft and the pick-up roller when the drive shaft supporting the holder member is rotated in a first direction, and disconnects the drive shaft and the pick-up roller when the drive shaft is rotated in an opposite direction from the first direction.

20. The sheet feeder according to claim 19, wherein the clutch member includes:

a first gear that is connected to the pick-up roller;

a second gear that is provided on the drive shaft apart from the first gear and rotates together with the drive shaft;

an arm member that has a collar section which rotatably inserts thereinto the drive shaft having the second gear and a protruding section which extends outwardly from the collar section and moves to a side to which the first gear is provided or an opposite side therefrom;

a clutch gear that is rotatably supported by the protruding section of the arm member and engaged with the second gear; and a resisting member that applies a load to the clutch gear to move the arm member in association with rotation of the second gear engaged with the clutch gear.

21. The sheet feeder according to claim 20, wherein the first gear is disposed toward the sheet holding member with respect to the clutch gear supported by the protruding section of the arm member and engages with the clutch gear as the protruding section of the arm member is moved toward the sheet holding member.

22. The sheet feeder according to claim 20, wherein the holder member includes a restriction member that restricts a movement of the arm member toward the first gear when the clutch gear is engaged with the first gear.

23. A pick-up roller unit mounted to a drive shaft of a printer for starting feed of a sheet of recording medium, comprising:

a holder member rotatably mounted to the drive shaft;

a drive gear mounted to the drive shaft, so as to rotate with the drive shaft, and within the holder member;

an arm member having a tubular collar portion through which the drive shaft passes and an arm extending from the collar portion;

a clutch gear rotatably mounted to the arm and engaged with the drive gear;

a pick-up roller mounted to the holder member away from the drive shaft, the pick-up roller having a gear section; and an interposed gear engaged with the gear section and engageable with the clutch gear.

24. The pick-up roller unit according to claim 23, further comprising:

a spring winding portion extending from the holder member to enclose a segment of the drive shaft; and a spring mounted on the spring winding portion, wherein one end of the spring engages the printer and the other end of the spring is attached to the holder member.

25. The pick-up roller unit according to claim 23, further comprising a resisting member between and contacting each of the clutch gear and the arm.

26. The pick-up roller unit according to claim 23, wherein the arm has a stopper section extending in each of opposing directions and from an end away from the tubular collar.

27. The pick-up roller unit according to claim 26, wherein each stopper section has a length greater than a radius of the clutch gear.

28. The pick-up roller unit according to claim 23, wherein the drive gear has a collar portion that non-rotatively fixes the drive gear to the drive shaft to rotate therewith.

29. The pick-up roller unit according to claim 28, wherein the drive gear has a stopper hook extending from the collar, the stopper hook engaging a recess in the drive shaft to prevent axial movement.

30. The pick-up roller unit according to claim 28, wherein the drive shaft has a flattened stopper face along and portion of a circumference thereof and the collar portion of the drive gear that a flattened key surface on an interior to mate with the flattened stopper face.

31. The pick-up roller unit according to claim 23, wherein the holder member comprises an upper frame and a lower frame connected together by a same means that attaches the other end of the spring to the holder member.

32. A sheet feeder, comprising:

a sheet holding member that holds sheets;

a pick-up roller that contacts the sheets held by the sheet holding member and feeds a topmost one of the sheets;

a drive shaft that is directly or indirectly connected to the pick-up roller and is separated from the sheet holding member by a fixed distance;

a holder member that is rotatably mounted to the drive shaft, rotatably supports the pick-up roller, and pivotally moves toward the sheet holding member when the drive shaft rotates in a predetermined direction; and a transmission member that transmits a drive force lower than a predetermined amount to the drive shaft by friction transmission.

* * * * *